DATA PROCESSING SYSTEM

Original Filed Feb. 12, 1960

INVENTORS
HENRY L. HEROLD
BY DAVID W. MASTERS

ATTORNEY.

3,502,853
DATA PROCESSING SYSTEM

Henry L. Herold, Palo Alto, Calif., and David W. Masters, Phoenix, Ariz., assignors to General Electric Company, a corporation of New York Original application Feb. 12, 1960, Ser. No. 8,392, now Patent No. 3,383,660, dated May 14, 1968. Divided and this application Aug. 5, 1966, Ser. No. 611,182
Int. Cl. H03k *13/32;* G06f *11/00*
U.S. Cl. 235—153 9 Claims

ABSTRACT OF THE DISCLOSURE

A data processing system for processing numeric and alphanumeric data, wherein when arithmetic operations are performed on numeric data the accuracy of the arithmetic result is verified, but wherein if an attempt is made to perform an arithmetic operation on alphanumeric data an alarm signal issues automatically to warn the system.

Figure 12:
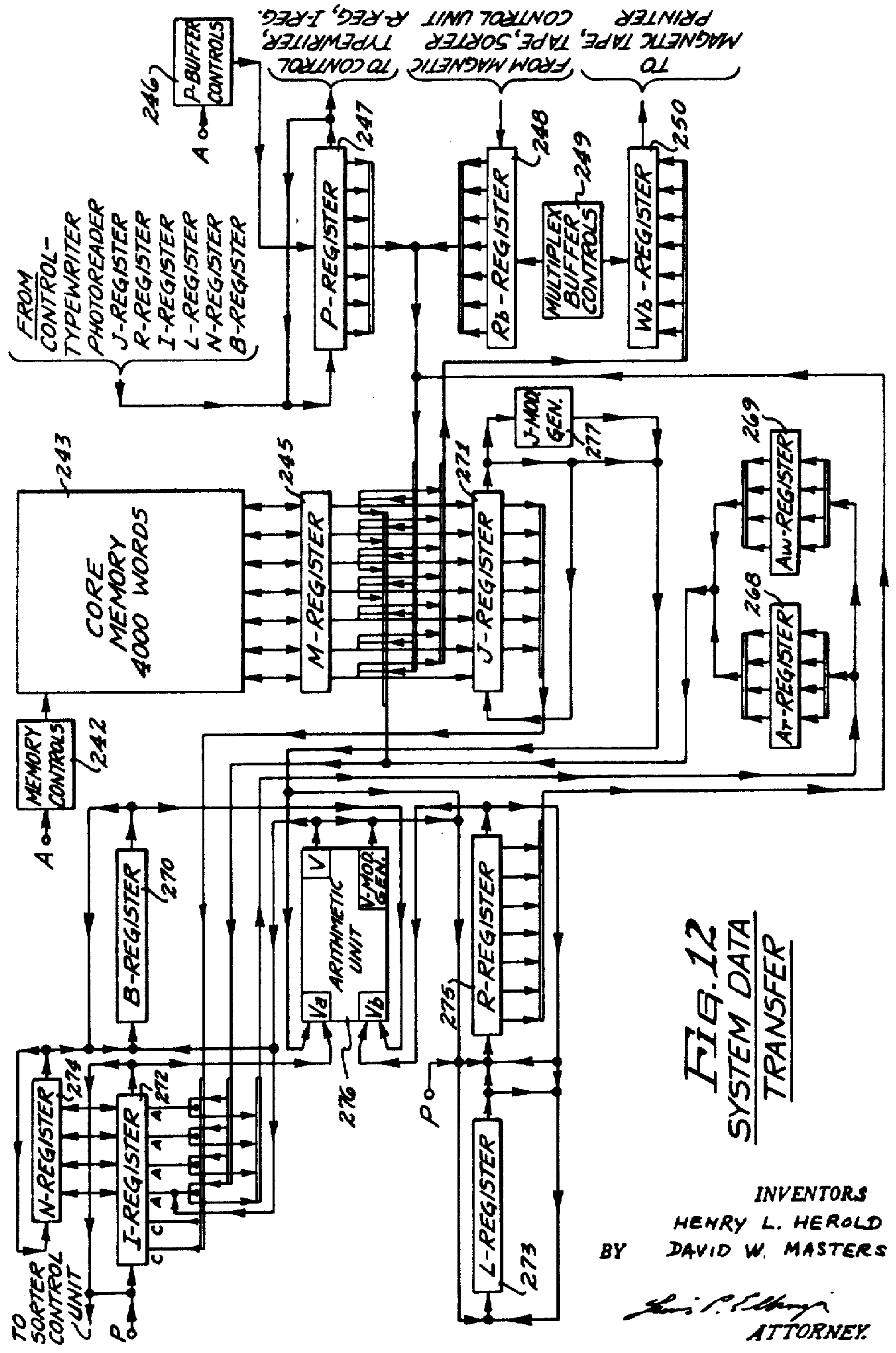

This is a division of application Ser. No. 8,392, filed Feb. 12, 1960 and now Patent No. 3,383,660.

This invention relates to information processing apparatus and more particularly to apparatus for processing data at high speeds and adapted to communicate with slower operating components.

In the processing of data, various arithmetic and logical operations are performed on data items by a data processing unit, which is adapted to execute a sequence of these operations in a very short period of time. To maintain a rapid rate of execution of these operations, the data processing unit must be able to immediately receive data items when needed and to immediately store data items after processing. Rapid receipt and storage of data items by the data processing unit is provided by a high-speed random access memory. The random access memory operates at a rate of speed compatible with that of the data processing unit and rapidly supplies a data item needed by the data processing unit or rapidly stores a data item provided by the data processing unit.

From time to time, the data processing unit will complete the processing of the data items in the memory or will fill the available memory storage space with processed data items, so that means must be provided to supply the memory with new data items for processing or to empty the memory contents into another storage medium. Consequently, additional storage media are provided, such as magnetic tape data storage units. These magnetic tape units communicate with the memory, under control of the data processing unit, to transmit new data items to the memory or to receive processed data items therefrom. However, magnetic tape units transmit and receive data items at a much slower rate than the data processing unit processes data; that is, the time between transmittal or receipt of successive data items by a tape unit is comparable to the time required for the data processing unit to execute several operations. Therefore, it is desirable, in order to maintain a high average data processing speed, that the data processing unit does not remain idle during a period when the magnetic tape unit is filling or unloading the memory. Instead, it is preferable that the data processing unit continue to execute the aforementioned sequence of operations, pausing only when the magnetic tape unit is ready to receive from or transmit to the memory a complete data item, and only if the memory would be otherwise occupied communicating with the data processing unit.

Therefore, it is an object of this invention to provide a high-speed data processing system adapted to communicate with slower operating components.

Another object of this invention is to provide a data processing system adapted to operate with minimum time of interruption for communication with slower operating components.

Another object of this invention is to provide a data processing system adapted to communicate with a slower operating component by halting only when a complete data item is ready to be transmitted or received by said component, and only if the data processing system would be otherwise unable to communicate with said component.

The foregoing objects are achieved by providing a data processing system wherein appropriate signals are delivered when a magnetic tape unit is ready to receive from or transmit to the memory a complete data item and wherein the data processing unit of said system continues to execute its normal sequence of operations, responding only to these signals to provide the necessary data item transfer. A first register is adapted to receive new data items from a magnetic tape unit and a second register is adapted to transmit processed data items to another magnetic tape unit. A first signal issues when the first register has a complete data item therein to notify the data processing unit that this data item must be transferred to the memory. A second signal issues when the second register is ready to receive a complete data item to notify the data processing unit that another data item must be transferred from the memory to the second register. In response to either one of these two signals, the data processing unit will effect the required data item transfer between the memory and one of these registers. This transfer will take place as the data processing unit continues to execute its sequence of operations, if during the current operation being executed when one of these two signals occurs, a period of adequate duration exist wherein the data processing unit does not communicate with the memory. If the data processing unit requires communication with the memory and the current operation will not terminate sooner than a predetermined time after the one of these two signals issues, the data processing unit is adapted to discontinue executing the current operation to permit the required data item transfer to take place. However, if the current operation is about to terminate when the one of said two signals occurs, the data processing unit discontinues execution of said sequence of operations following completion of said current operation, whereupon the required data item transfer takes place.

In a data processing unit of the type described, both numeric and alphabetic data items are processed. The numeric data items represent numerical quantities and have checking information in a predetermined sector thereof representing the numerical weight of the balance of the data item. The alphabetic items are employed to represent both alphabetic characters and numeric characters and bear information in said predetermined sector thereof that identifies these data items as being alphabetic. When an arithmetic unit of the data processing unit performs an arithmetic operation on numeric data items, the checking information borne by these items is employed for verifying the accuracy of the resulting data delivered by the arithmetic unit. However, it is usually improper and erroneous for alphabetic data items to be applied to the arithmetic unit, inasmuch as these items are not intended to have numeric operations performed thereon, and because the resulting data delivered by the arithmetic unit would have little significance.

It is, therefore, another object of this invention to provide a data processing unit adapted to give notification if an arithmetic operation is attempted on a non-numeric data item.

Another object of this invention is to provide a data processing unit adapted to apply an alarm signal when an alphabetic data item is received by the arithmetic unit thereof.

Another object of this invention is to modify the operation of a data processing unit if an alphabetic data item is received by the arithmetic unit thereof.

The immediately preceding objects are achieved by providing an alarm if an alphabetic data item is applied to the arithmetic unit of such a data processing unit and by causing said arithmetic unit to halt in response to said alarm. Means is provided to verify the accuracy of the arithmetic operation performed by the arithmetic unit in accordance with the checking information provided with numeric data items applied to the arithmetic unit. An alarm signal issues when said verification fails. Means is further provided to respond to the identification information provided with an alphabetic item that may be applied to said arithmetic unit for also causing said alarm signal to issue. When the alarm signal issues, the data processing system and, consequently, the arithmetic unit thereof are brought to a halt.

FIGURE 12 is a block diagram of the data storage elements, the data transfer paths between these elements, and the major control elements of the system of FIG. 1.

DATA PROCESSING SYSTEM—DETAILS

The Data Processing System is shown symbolically in FIG. 12 to illustrate the elements therein which store data, the paths of data transfer between these elements, and major control elements of the system.

Instruction words for data processing, and operand words which are to be processed are stored in the 4,000 word Core Memory during data processing operations. Temporary storage of data words is provided in the various registers of the system. Data is most often transferred between registers by means of register transfers, not shown in FIG. 12. Most registers are also adapted to shift the data therein by the employment of register transfers between digit positions.

The instruction word which directs the system operation is stored in the I-register 272. The I-register comprises two registers, a 2-digit C-register and a 4-digit A-register. The I-register stores the 6 least significant digits of an instruction word, these digits including the command portion and the address portion. The command portion is stored in the C-register and the address portion in the A-register. The command portion in the C-register controls the type of operation to be executed by the system. The address portion in the A-register usually indicates the memory location from which the operand word is to be received, or where a data word is to be stored. However, the address portion is also employed as a control function to supplement the command portion in controlling the type of operation to be executed. The memory location of the next instruction to be executed is stored in the 4-digit N-register 274. As execution of an instruction is nearing completion the next-instruction address stored in the N-register is transferred to the A-register, and this address provides the Memory Controls 242 with the information to obtain the next instruction from the Core Memory 243.

All data words received from the Core Memory or entered into the Core Memory must pass through the 7-digit M-register 245. Therefore, when an instruction is to be received from the Core Memory the A-register contents direct the Memory Controls to obtain the instruction from the location then indicated in the A-register. This instruction is first transferred to the M-register and then to the 7-digit J-register 271. From the J-register the 6 least significant digits of the instruction word are transferred to the I-register and the instruction is then executed. Operand words needed by the instruction are obtained from the Core Memory by the same process; that is, by a first transfer to the M-register under control of the address portion of the instruction word in the A-register and then by a transfer to the J-register.

Arithmetic operations, sorting operations, comparison operations, etc., on operand words are performed primarily by employing the Arithmetic Unit 276, the L-register 273, and the R-register 275. The L-register and R-register are both 7-digit registers and each stores a complete data word. The L- and R-registers are employed together when data processing is performed on double-precision words, and when so employed are designated as the FULL-register. The R-register is usually employed when processing single data words. The Arithmetic Unit is adapted to perform the operation of addition or subtraction on a pair of words received simultaneously from the J-register and the R-register or on data received simultaneously from the A-register and the B-register 270. When the contents of J and R are received by the Arithmetic Unit the output signals thereof are entered into the R-register, if single numeric words are being processed, and into the FULL-register if double-precision words are being processed.

A data word in the R-register may be transferred to the M-register for storage in the Core Memory at the location designated by the A-register contents.

The 4-digit B-register is employed to modify the address portion of the instruction word in the A-register. This modification is performed by adding the B-register contents to the A-register contents in the Arithmetic Unit, and by entering the output signals of the Arithmetic Unit into the A-register.

The A*r*-register 268 and the A*w*-register 269 store memory addresses during respective Multiplex Buffer read and write operations and are adapted to enter the address into the A-register when the Multiplex Buffer is to transfer a word to the Core Memory or to receive a word therefrom.

The modulo-3 of all words received by the J-register from the Core Memory is compared against the mod-bits of these words by the J-mod-generator 277, which accumulates the modulo-3 of a word as it ring shifts in the J-register. The V-mod-generator of the Arithmetic Unit accumulates the modulo-3 of the Arithmetic Unit output signals in order to apply the appropriate mod-bits to this word.

The Central Processor receives data from the Control Typewriter, the Photoreader, the Tape Handlers, and the Character Reader, and transmits data to the Tape Handlers, the Printer, the Control Typewriter, and the Sorter.

The 7-digit P-register 247, which is a part of the P-Buffer, temporarily stores a data word being transferred from the Control Typewriter or from the Photoreader to Memory. The P-register also temporarily stores a data word being transferred from Memory to the Control Typewriter. In so exchanging data with the Memory, the P-Buffer is controlled by the Central Processor and its mode of operation is initiated by the contents of the A-register, which sets the P-Buffer Controls 246. The P-Buffer, when directed by the Control Typewriter, coordinates the typing out of the contents of the B, I, L, N, P, and R-registers by the Control Typewriter. The Control Typewriter and the P-Buffer also cooperate in entering data words directly into the I-register and the R-register.

The R*b*-register 248 and the W*b*-register 250 form a part of the Multiplex Buffer and are controlled by the Multiplex Buffer Controls 249. The 7-digit R*b*-register temporarily stores a data word being transferred from magnetic tape or the Sorter Control Unit to Memory. The 7-digit W*b*-register temporarily stores a data word being transferred from Memory to magnetic tape or to the Printer.

For a complete description of the system of FIGURE 12 and of the instant invention which is embodied in such system, reference is made to United States Patent 3,383,-660 issued to H. L. Herold et al. and assigned to the assignee of the present invention. More particularly, FIGURES 1–11 and 13–245 of the drawing; column 1, lines 8–73; columns 2–24; column 25, lines 1–53; column 27, lines 31–75; columns 28–258; and column 259, lines 1–33 of United States Patent 3,383,660 are incorporated herein by reference and made a part of the instant patent application.

The claimed subject matter of the instant invention is more particularly pointed out in the following portions of U.S. Patent, 3,383,660:

Data Representation—Column 8, line 42, through column 11, line 40.

Mod-Bits—Column 11, line 41 through column 12, line 19.

Data Processing System Details—Column 25, line 55 through column 27, line 36.

Central Processor—Column 62, line 41, through column 68, line 41.

J-Mod Generator—Column 71, line 39 through column 72, line 27.

Arithmetic Unit—Column 72, line 28 through column 76, line 8.

P-Mod Generator—Column 93, line 50 through column 94, line 9.

Modulo-3 Comparison—Column 153, line 33, through column 154, line 50.

What is claimed is:

1. In a data processing unit adapted to receive numeric data items and alphabetic data items, said numeric data item having information in a predetermined sector thereof corresponding to the numeric weight of the balance of said numeric data item, said alphabetic data item having information in said predetermined sector thereof identifying the alphabetic nature of said alphabetic data item, the combination comprising: an arithmetic unit for performing arithmetic operations on data items received thereby, means for verifying the accuracy of an operation performed by said arithmetic unit in accordance with the contents of said predetermined sectors when said arithmetic unit receives numeric data items, and means for halting the operation of said arithmetic unit in response to the information in said predetermined sector when said arithmetic unit receives an alphabetic data item.

2. In a data processing system adapted to receive numeric data items and alphabetic data items, each of said data items comprising $n$ data entities, wherein $n$–1 data entities of said numeric data item represent a numeric quantity and the $n^{th}$ data entity thereof provides information representing the modulo-3 of said numeric quantity, and wherein each pair of data entities of $n$–1 data entities of said alphabetic data item represents an alphabetic or a numeric character and the $n^{th}$ data entity thereof provides information identifying the data item as alphabetic, the combination comprising: an arithmetic unit for providing the sum of the numeric quantities of data items received thereby, first means coupled to said arithmetic unit and adapted to provide information representing the modulo-3 of the sum provided thereby, second means for providing the sum of the modulo-3 representations of the data items received by said arithmetic unit, means coupled to said first means and said second means for providing an alarm signal when said information representing the modulo-3 of said sum differs from said sum of the modulo-3 representations, and means responsive to said identifying information for modifying the operation of said arithmetic unit when said arithmetic unit receives an alphabetic data item.

3. In a data processing system adapted to receive numeric data items and alphabetic data items, each of said data items comprising $n$ data entities, wherein $n$–1 of said data entities of said numeric data item represent a numeric quantity and the $n^{th}$ data entity thereof provides information representing the modulo-3 of said numeric quantity, and wherein each pair of data entities of $n$–1 data entities of said alphabetic data item represents an alphabetic or a numeric character and the $n^{th}$ data entity thereof provides information identifying the data item as alphabetic, the combination comprising: an arithmetic unit for providing the sum of the numeric quantities of data items received thereby, first means coupled to said arithmetic unit and adapted to provide information representing the modulo-3 of the sum provided thereby, second means for providing the sum of the modulo-3 representations of the data items received by said arithmetic unit, alarm means coupled to said first means and said second means and adapted to issue an alarm signal when said information representing the modulo-3 of said sum differs from said sum of the modulo-3 representations, and means responsive to said identifying information for causing said alarm means to issue said alarm signal when said arithmetic unit receives an alphabetic data item.

4. A combination, as in claim 3, further including means responsive to said alarm signal for halting the operation of said arithmetic unit.

5. In a data processing unit adapted to receive first and second kinds of data items, each of said data items having information characteristic of the data item in a sector thereof, the combination comprising: interaction means coupled to receive a pair of said data items and controllable for providing an interaction operation between said pair for delivering a result item representative of said operation; means responsive to the information in said sectors of said data item pair for verifying the accuracy of said result item when the data items of said pair are of said first kind; and means responsive to the information in said sector of at least one data item of said pair for modifying the operation of said data processing unit when said one data item is of said second kind.

6. In a data processing unit adapted to receive first and second kinds of data items, each of said data items holding in a sector thereof information characteristic of the data in the remainder of said data item, the combination comprising: means responsive to said remainder data of said data items of said first kind for inserting information representing the numeric weight of said remainder data in said sectors of said first kind of data items; means responsive to data items of said second kind for inserting information denoting the kind of item represented in said sectors of said second kind of data items; interaction means coupled to receive a pair of said data items and controllable for providing an interaction operation between said pair for delivering a result item representative of said operation; means responsive to the information in said sectors of said data item pair for verifying the accuracy of said result item when the data items of said pair are of said first kind; and means responsive to the information in said sector of at least one data item of said pair for modifying the operation of said data processing unit when said one data item is of said second kind.

7. In a data processing unit adapted to receive first and second kinds of data items, each of said data items of said first kind having information representing the numeric weight of the remainder of the data item in a predetermined sector thereof, each of said data items of said second kind having information denoting the kind of item represented in said sector thereof, the combination comprising: interaction means coupled to receive a pair of said data items and controllable for providing an interaction operation between said pair for delivering a result item representative of said operation; means responsive to the information in said sectors of said data item pair for verifying the accuracy of said result item when the data items of said pair are of said first kind; and means responsive to the information in said sector of at least one data item of said pair for modifying the operation of said data processing unit when said one data item is of said second kind.

8. In a data processing unit adapted to receive first and second kinds of data items, each of said data items of said first kind having information representing the numeric weight of the remainder of the data item in a predetermined sector thereof, each of said data items of said second kind having information denoting the kind of item represented in said sector thereof, the combination comprising: interaction means coupled to receive a pair of said data items and controllable for providing an interaction operation between said pair for delivering a result item representative of said operation; verification means responsive to the information in said sectors of said data item pair for verifying the accuracy of said result item when the data items of said pair are of said first kind and controllable to deliver a signal when said verification fails; and means responsive to the information in said sector of at least one data item of said pair for controlling said verification means to deliver said signal when said one data item is of said second kind.

9. A combination, as in claim 8, further including means responsive to said signal for halting the operation of said interaction means.

References Cited

UNITED STATES PATENTS

| | | | |
|---|---|---|---|
| 2,837,278 | 6/1958 | Schreiner et al. | 235—153 X |
| 2,969,912 | 1/1961 | Reynolds | 235—153 |
| 3,008,127 | 11/1961 | Bloch et al. | 340—172.5 |
| 3,133,190 | 5/1964 | Eckert et al. | 340—172.5 X |

MALCOLM A. MORRISON, Primary Examiner

C. E. ATKINSON, Assistant Examiner

U.S. Cl. X.R.

340—172.5